United States Patent [19]

Davis et al.

[11] Patent Number: 4,619,041
[45] Date of Patent: Oct. 28, 1986

[54] METHOD FOR MANUFACTURING COUPLED CAVITY TRAVELLING WAVE TUBES

[75] Inventors: Peter R. Davis, Witham; Brian F. Cooper, Chelmsford; David H. Cottey, East Hanningfield, all of England

[73] Assignee: English Electric Valve Company Limited, Chelmsford, England

[21] Appl. No.: 539,147

[22] Filed: Oct. 5, 1983

[30] Foreign Application Priority Data

Oct. 6, 1982 [GB] United Kingdom ............... 8228614
Oct. 27, 1982 [GB] United Kingdom ............... 8230702

[51] Int. Cl.[4] ..................... H01P 11/00; H01Q 13/00
[52] U.S. Cl. ........................................ 29/600; 315/3.6
[58] Field of Search ................... 29/600; 315/3.5, 3.6

[56] References Cited

U.S. PATENT DOCUMENTS

| | | | |
|---|---|---|---|
| 3,636,402 | 1/1972 | Horigome | 315/3.6 |
| 3,678,575 | 7/1972 | Akeyama et al. | 29/600 |
| 3,684,913 | 8/1972 | James et al. | 315/3.5 |
| 4,129,803 | 12/1978 | Friz | 29/600 |
| 4,143,341 | 3/1979 | Gross | 315/3.6 X |

FOREIGN PATENT DOCUMENTS

| | | | |
|---|---|---|---|
| 2128110A | 4/1984 | United Kingdom | 29/600 |
| 2128111 | 4/1984 | United Kingdom | 29/600 |

OTHER PUBLICATIONS

"Waveguide Components", by D. J. Doughty, *Journal Brit. I.R.E.* (Feb. 1961) pp. 169, 176, 177, 179.
"How Cold Hobbing Shapes Intricate Parts", by Alex Phillips, *The Iron Age* (Apr. 3, 1958) pp. 91-93.

*Primary Examiner*—Howard N. Goldberg
*Assistant Examiner*—R. S. Wallace
*Attorney, Agent, or Firm*—Spencer & Frank

[57] ABSTRACT

A millimeter coupled cavity travelling wave tube has each of its slow wave structures formed of at least one longitudinally extending member having holes made therethrough by a hobbing process, which holes constitute at least in part the cavities of the slow wave structure. In a preferred embodiment a one and one only such longitudinally extending member is provided, the holes therein each a whole cavity. The hobbing is such that a buttress is left outstanding from each cavity facing surface of a cavity separating wall and the beam hole is bored axially through said member from end to end through said buttresses. After machining of the cavity coupling holes in the cavity separating walls (e.g. by spark erosion) the cavities are closed by plates brazed to opposite faces of the member.

21 Claims, 8 Drawing Figures

METHOD FOR MANUFACTURING COUPLED CAVITY TRAVELLING WAVE TUBES

BACKGROUND OF THE INVENTION

This invention relates to coupled cavity travelling wave tubes and in particular, though not exclusively, to millimeter coupled cavity travelling wave tubes, that is to say travelling wave tubes for operation at a frequency in the region of 35 GHz and up to and beyond 95 GHz.

A typical coupled cavity travelling wave tube as at present known is illustrated in FIGS. 1 and 2 of the accompanying drawing of which, FIG. 1 is a longitudinal section through part of the slow wave structure of the tube, and FIG. 2 shows the slow wave structure in cross-section along the line A—A of FIG. 1.

Referring to FIGS. 1 and 2, the slow wave structure consists of a series of cylindrical cavities 1, of constant height. In each of the walls 2 separating one of the cavities 1 from another is an arcuate coupling slot 3, 4 of which the slots 3 in alternate ones of the walls 2 are staggered relative to the slots 4 in the remaining ones of the walls 2. Coupling slots 3, 4 provide for radio frequency (R.F.) coupling between the cavities 1.

In the centre of each of the walls 2 is provided an axially aligned drift tube or ferrule 5 through which, in operation, the electron beam passes down the length of the slow wave structure from an electron gun (not shown) to a collector (not shown).

The dimensions and positions of the drift tubes 5 influence both bandwidth and efficiency.

The method of construction normally employed to construct the slow wave structure illustrated in FIGS. 1 and 2 is as follows.

The slow wave structure is made up of sections each of which comprises a wall 2, a coupling slot 3 or 4, a drift tube 5 and a short length of the cylindrical wall 6 of the slow wave structure. Each section is blanked out and then machined to achieve the final dimensions.

The complete structure is then built up by stacking one section upon the next together with brazing wire or foil suitably placed in between.

The whole assembly is then jigged for alignment and furnace brazed.

Whilst such methods of assembly are very satisfactory for coupled cavity travelling wave tubes for operation below millimeter frequencies, it is believed that if applied to millimeter coupled cavity travelling wave tubes difficulties would be experienced due to the extremely small tolerances which would be permitted in the dimensioning and assembly of the slow wave structure of such tubes. It will be appreciated that in a millimeter coupled cavity travelling wave tube, the overall dimensions of each cavity in the slow wave structure are very small and in each tube typically three slow wave structures may be required each containing up to thirty cavities. It is estimated that for consistent performance, particularly for a tube operating in the region of 95 GHz, dimensional and assembly tolerances of the order of 0.0001" (one ten thousandth of an inch or in other words 0.00254 mm) are required.

Tolerances of this order cannot be achieved by conventional machines under normal workshop conditions. To carry out the machining of the individual sections as hereinbefore described in the quantities which would be required for normal production, would require high precision lathes and control equipment, of the type used for the diamond turning of optical components, operated in a closely controlled environment. For production purposes, providing such machining is considered to be impracticable and even if it were not the yield of good sections would likely be low.

Even with individual sections machined within tolerance, building up the complete structure by stacking the individual sections militates against the maintenance of dimensional tolerances during brazing.

Associated with the problems of manufacture outlined above are difficulties relating to inspection, measurement and handling.

SUMMARY OF THE INVENTION

One object of the present invention is to provide an improved method of manufacturing a coupled cavity travelling wave tube, and in particular the slow wave structure thereof, in which one or more of the above difficulties is reduced or avoided.

According to this invention a method of constructing a coupled cavity travelling wave tube is provided wherein a slow wave structure therefor is formed of at least one longitudinally extending member through which a plurality of holes are formed utilising a hobbing technique, each hole constituting part of a desired cavity in the completed slow wave structure.

Preferably said hobbing technique comprises hobbing deeply into a billet of material out of which a longitudinally extending member is to be derived and taking a slice or slices out of said billet to result in said longitudinal member with said holes now hobbed right through from a front longitudinally extending face to a rear longitudinally extending face.

In one method of construction in accordance with the present invention each of said holes constitutes one part of a desired cavity, there being provided a second complementary longitudinally extending member which is united longitudinally-extending-face to longitudinally-extending-face with the first so that the part cavities in one form with the part cavities in the other, the desired cavities in the completed structure.

Normally each part cavity will be a half cavity.

Preferably in each longitudinally extending member, half beam holes are formed in the half cavity separating walls in the same hobbing operation as forms the half cavities.

Preferably the backs of the part cavities in each longitudinally extending member are closed off by a plate brazed or otherwise fixed to the rear face of each member, preferably prior to said two longitudinally extending members being united face to face.

Preferably, prior to said cavities in each longitudinally extending member being closed off by a plate, and prior to said two longitudinally members being united face to face, cavity coupling holes are provided as required in the part separating walls of the two members by for example conventional machining or spark erosion.

In another method of construction in accordance with the present invention each of said holes constitutes the whole of a desired cavity there being provided but one and one only longitudinally extending member through which said holes are made by hobbing, the required beam hole being formed by machining (e.g. boring or spark erosion) from one end of said longitudinally extending member to the other.

Preferably said hobbing is such that buttresses are left outstanding on at least one side and preferably both sides, of each cavity separating wall said beam hole being bored through said buttresses.

Buttress material above and below the beam hole passing through a buttress may be removed to leave a tubular form extending from the cavity separating wall of which the buttress forms a part.

Cavity coupling holes as required in the cavity separating walls may be formed therein by, for example, conventional machining or spark erosion, and thereafter plates are brazed or otherwise fixed to opposite faces of the longitudinally extending member in order to close off said cavities.

Preferably however, said cavity coupling holes are themselves formed as part of the hobbing process. This may be accomplished by utilising a hob which forms cavity separating walls or part cavity separating walls which do not extend, or at least do not extend at full height, transversely across the whole width of a cavity, there being a wall portion to one side missing from alternate cavity separating walls or part cavity separating walls and a wall portion to the other side missing from the remaining cavity separating walls or part cavity separating walls.

DESCRIPTION OF THE PREFERRED EMBODIMENTS

Figure 2:
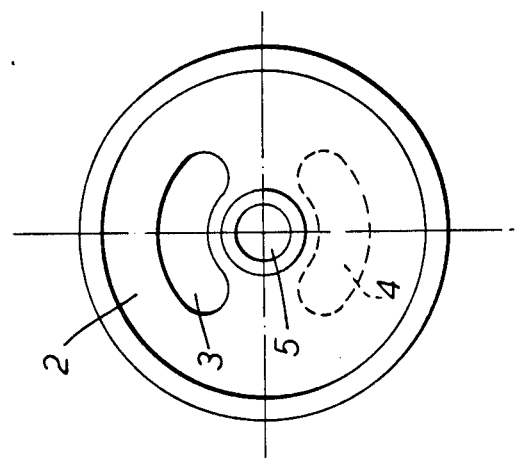
FIG. 2 shows the slow wave structure in cross-section along the line A—A of FIG. 1.
Figure 1:
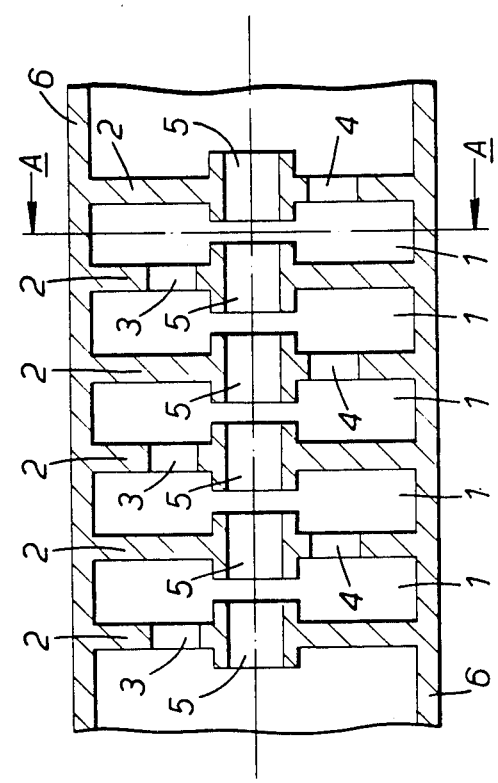
FIG. 1 is a longitudinal section through part of the slow wave structure of a typical coupled cavity travelling wave tube.

In FIGS. 3 to 8, corresponding numbers are used as references to corresponding parts in FIGS. 1 and 2.

Figure 4:
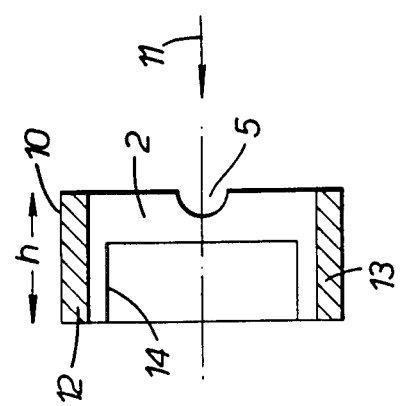
FIG. 4 shows the structure of FIG. 3 in cross-section along the line B—B in FIG. 3.
Figure 3:
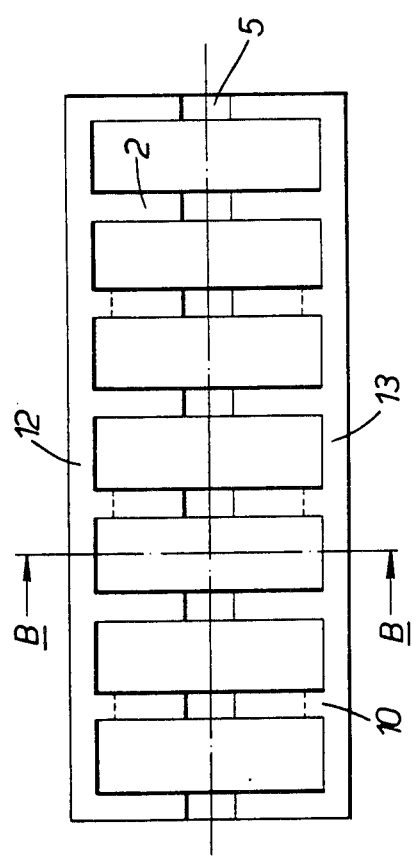
FIG. 3 is a longitudinal section through one part of one slow wave structure of one example of a coupled cavity travelling wave tube made in accordance with the present invention.

Referring to FIGS. 3 and 4, in this example each slow wave structure is made of two similar halves each extending for the axial length of the slow wave structure and each as illustrated.

Figure 5:
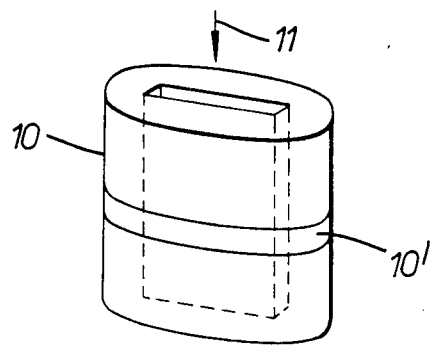
FIG. 5 illustrates the basic hobbing technique employed during manufacture of the slow wave structures illustrated in FIGS. 3 and 4.

To make each half, and referring to FIG. 5, a billet 10 of annealed copper is hobbed in one operation in the direction of arrow 11 to provide the shape shown in FIG. 4. Hobbing takes place deeply into the billet 10, but not throughout. The billet 10 is then sliced as represented at 10' and machined externally to produce the longitudinally extending member illustrated in FIGS. 3 and 4.

In this example the slice 10' is of half cavity height.

Thus the height h (the dimension perpendicular to the plane of the paper in FIG. 3) of the longitudinally extending member of FIGS. 3 and 4 is also a halfcavity height.

In effect what is provided is a latticework consisting of two sides 12, 13 united by the transversely extending walls 2 each of which in effect forms one half of a cavity separating wall in a completed slow wave structure. It will be noted that, in the case of FIGS. 3 and 4, the slow wave structure is to be formed ferruleless, that is to say, no ferrules or drift tubes are provided to be projected from the walls 2, the drift tubes being, as it were, wholly contained within the walls 2 in the completed tube. Also it will be noted that the cavities formed are of square or rectangular section.

The technique of hobbing is known per se and resides in pressing a male master form, or in other words a body of shape the reverse of that required, into a relatively soft material, e.g. annealed copper.

In making the male master form a blank of hardened tool steel is ground into the required shape under carefully controlled conditions to achieve the desired accuracy. In practice it has been found that accuracies of the desired order and indeed higher can be achieved in making the master form.

In use, wear may be expected to be insignificant throughout the life of the master form which will normally fail due to fracture eventually after possibly several hundreds of hobbing operations. Thus throughout the life of the master form shapes may be expected to be reproduced repeatedly with a high degree of accuracy.

The structure so far described, being in effect a latticework, is open at the back and front as viewed. Using this as access, coupling slots are provided as required in the walls 2 by an operation separate from hobbing, in this case by spark erosion. In the wall 2 seen in FIG. 4, the machined coupling slot is shown at 14. The walls immediately on either side of the wall seen in FIG. 4 will have no such coupling slot machined therein since the coupling slots in the finished structure are required to be staggered. Thus, alternate ones of the half cavity separating walls 2 in FIGS. 3 and 4 are machined to form coupling slots whilst in the other half structure, when this is made, the complementary half walls will like the remaining half walls in the half structure illustrated not be machined to form coupling slots. The remaining walls in the other half structure will of course be machined to provide coupling holes.

With all machining finished in both half structures the back of each is closed off by a plate (not shown) brazed along its length and then both half structures are brought face to face and united by brazing or diffusion bonding.

With the method described with reference to FIGS. 3 and 4, if it is desired to have ferrules or drift tubes extending out of the cavity separating walls, the part beam holes 5 in each part wall 2 of both half structures may be made oversized and an individual ferrule or drift tube brazed into each part beam hole of one of the half structures before the two half structures are united. Brazing of the individual ferrules into the part beam holes of the other half structure is then accomplished as part of the final furnace brazing operation.

Referring to FIG. 6, in this case again a billet 10 of annealed copper is hobbed as illustrated in FIG. 5, but in this case only one slice of full cavity height is taken. Unlike the method described with reference to FIGS. 3 and 4 the main part of the slow wave structure is not formed of two half structures but of one body.

Figure 6:
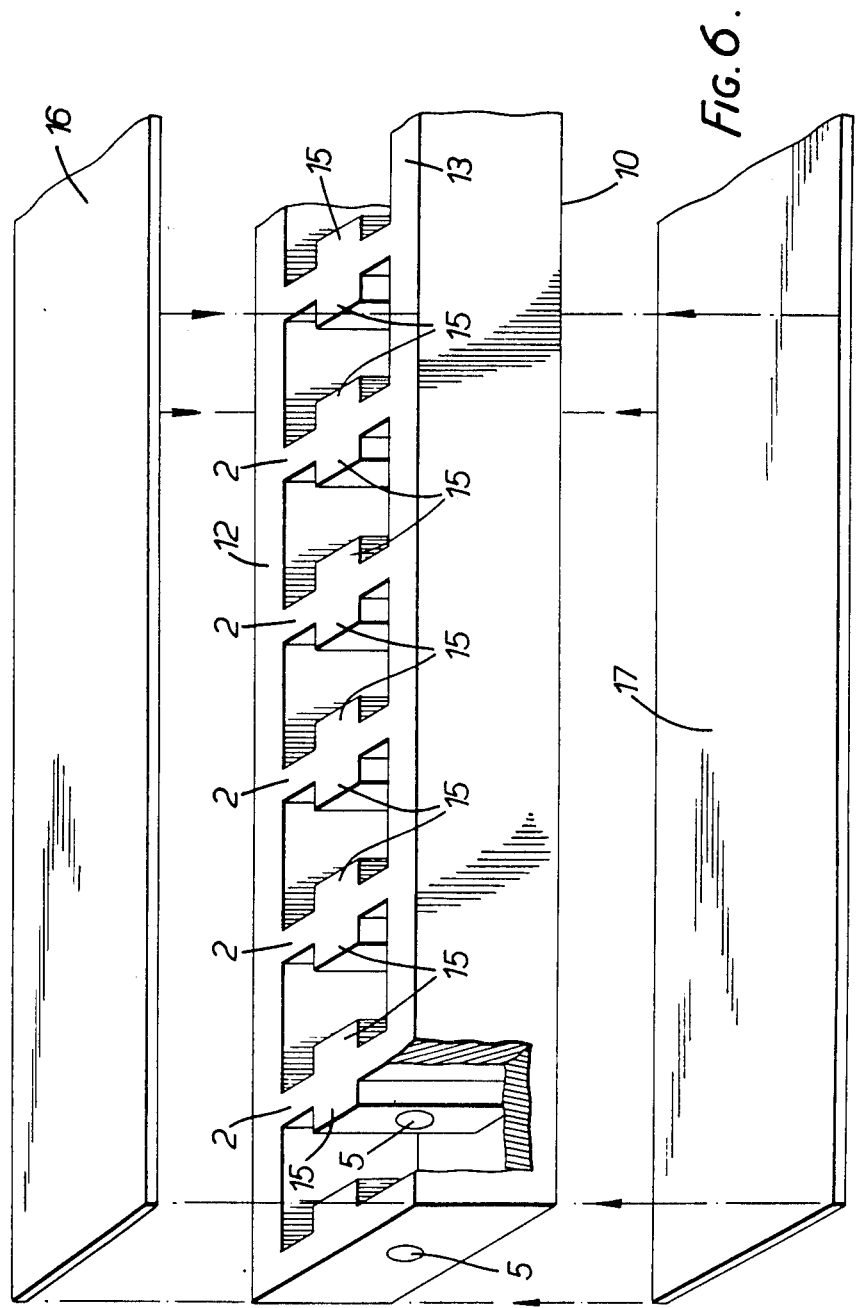
FIG. 6 is an exploded perspective view, part cut away and part broken off, of one slow wave structure of another example of a coupled cavity travelling wave tube made in accordance with the present invention.

The shape of the hob used in the method described with reference to FIG. 6 is such that the cavities 1 are again generally square or rectangular but buttresses 15 are left outstanding from both sides of the cavity separating walls 2. The buttresses 15 extend from top to bottom as viewed, of the walls 2.

The beam hole 5 is then bored through the length of the structure from end to end through all of the separating walls and buttresses. The buttresses 15 act, in effect, like extended drift tubes and if desired buttress metal above and below (as viewed) the bored beam hole 5 may be removed by machining or spark erosion to leave a tubular form extending from each side of a separating wall 2.

Again coupling holes are machined into the separating walls 2, as required, before top and bottom plates 16, 17 are brazed into position to complete the cavities.

Referring to FIGS. 7 and 8, again the slice taken from the billet 10 is of full cavity height h as described with reference to FIG. 6, but in this case the shape of the hob is such that each cavity separating wall extending only part, albeit more than half, of the way across the width of a cavity. Thus there is a wall portion to one side missing from alternate cavity separating walls 18 and a wall portion to the other side missing from the remaining cavity separating walls 19. The result is that coupling takes place via what may be described as a serpentine waveguide.

Again in this example buttresses 15 are left outstanding from either side of the walls 18, 19 and the beam hole 5 formed as previously described by machining (e.g. boring or spark erosion) from one end of the longitudinally extending member to the other.

The cavities are again completed by plates (not shown) corresponding to plates 16 and 17 in FIG. 6.

Figure 7:
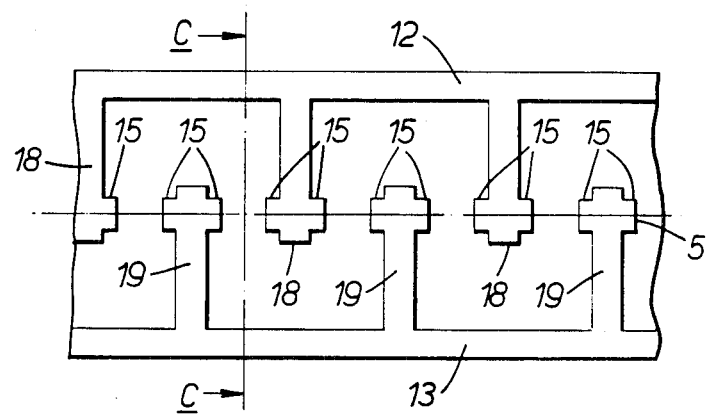
FIG. 7 is a longitudinal section, part broken off, of one slow wave structure of another example of a coupled cavity travelling wave tube made in accordance with the present invention.
Figure 8:
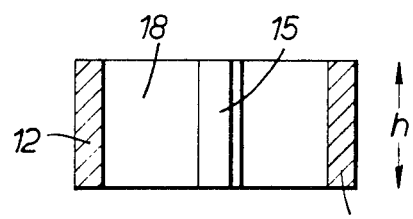
FIG. 8 shows the structure of FIG. 7 in cross-section along the line C—C of FIG. 7.

As will be appreciated, the technique described with reference to FIGS. 7 and 8 may be applied to give a "ferruleless" construction by suitably shaping the hob to form the walls 18, 19 but not the buttresses 15.

It will also be appreciated that the techniques described with reference to FIGS. 6, 7 and 8 may be applied to a construction in which two longitudinally extending members, each of half cavity height, are united face to face generally as described with reference to FIGS. 3 and 4.

We claim:

1. A method of constructing a coupled cavity travelling wave tube including the steps of forming a slow wave structure therefor of at least one longitudinally extending member having front and rear longitudinally extending faces, and utilising a hobbing technique for forming in one bobbing operation a plurality of holes through said at least one member, with said holes being hobbed right through from the front longitudinally extending face to the rear longitudinally extending face and each hole constituting at least part of a whole cavity in the completed slow wave structure.

2. A method as claimed in claim 1 and wherein each of said holes constitutes only part of a whole cavity, wherein there is a pair of longitudinally extending members that are complementary, and including uniting the longitudinally extending members longitudinally-extending-face to longitudinally-extending-face so that the part cavities in one form with the part cavities in the other, the whole cavities in the completed structure.

3. A method as claimed in claim 2 and wherein each part cavity is a half cavity that is separated from adjacent half cavities by half cavity separating walls, and including forming half beam holes in each longitudinally extending member in the half cavity separating walls in the same hobbing operation as forms the half cavities.

4. A method as claimed in claim 1 and including closing off the backs of the holes in a longitudinally extending member by fixing a plate to the rear face of the member.

5. A method as claimed in claim 4 and wherein each of said holes constitutes only part of a whole cavity, wherein there is a pair of longitudinally extending members that are complementary, and including uniting said members longitudinally-extending-face to longitudinally-extending-face so that the part cavities in one form with the part cavities in the other, the whole cavities in the completed structure, and closing off the part cavities in each longitudinally extending member by fixing a plate to the rear face of each member.

6. A method as claimed in claim 5 and wherein said part cavities are separated by part cavity separating walls and including, prior to said part cavities in each longitudinally extending member being closed off by a plate, and prior to said two longitudinally extending members being united face to face, providing cavity coupling holes in the part cavity separating walls of the two members.

7. A method as claimed in claim 1 and wherein each of said holes constitutes a whole cavity, there being provided but one and one only longitudinally extending member through which said holes are made by hobbing, and including forming a beam hole by machining from one end of said longitudinally extending member to the other.

8. A method as claimed in claim 7 and wherein said holes are separated by cavity separating walls, and said hobbing is conducted so that buttresses are left outstanding on at least one side of each cavity separating wall, said beam hole being bored through said buttresses.

9. A method as claimed in claim 8 and wherein said hobbing is conducted so that buttresses are left outstanding on both sides of each cavity separating wall, said beam hole being bored through said buttresses.

10. A method as claimed in claim 8 and including removing buttress material above and below the beam hole passing through a buttress to leave a tubular form extending from the cavity separating wall of which the buttress forms a part.

11. A method as claimed in claim 7 and wherein said holes are separated by cavity separating walls and including forming cavity coupling holes in the cavity separating walls by one of conventional machining and spark erosion, and thereafter fixing plates to the faces of the longitudinally extending member in order to close off said cavities.

12. A method as claimed in claim 7 and wherein said holes are separated by cavity separating walls, and including forming cavity coupling holes as part of the hobbing process.

13. A method as claimed in claim 1, and wherein the holes in each said at least one longitudinally extending member have a predetermined width and a predetermined height and are separated from each other by separating walls, and including utilising a hob which forms said separating walls so that they do not extend transversely across the whole predetermined width of a hole, at least not at said predetermined height, there being a wall portion to one side missing from alternate separating walls and a wall portion to the other side missing from the remaining separating walls.

14. A method of constructing a coupled cavity travelling wave tube including the steps of hobbing deeply into a billet of material to form a plurality of holes therein, and taking at least one slice out of said billet to form at least one longitudinally extending member having front and rear longitudinally extending faces, with holes extending right through each at least one longitudinally extending member from the front longitudinally extending face thereof to the rear longitudinally extending face thereof, each hole constituting at least part of a cavity in a slow wave structure for the travelling wave tube.

15. A method of constructing a coupled cavity travelling wave tube having a slow wave structure, comprising the steps of:
   hobbing a billet to form a row of holes therein, said holes having axes that are parallel;
   slicing said billet at two spaced-apart and parallel planes which intersect said holes substantially perpendicular to the axes thereof to form a first latticework structure having first and second parallel faces and having spaced-apart wall portions between said faces;
   forming a second latticework structure by hobbing and slicing, said second latticework structure having first and second parallel faces and having spaced-apart wall portions between said faces;
   machining said second faces of said latticework structures to form coupling slots in alternate wall portions;
   joining said first faces of said latticework structures together; and
   affixing a plate to each of said second faces.

16. A method as claimed in claim 15, further comprising forming part of a beam hole in each wall portion at the first faces of said latticework structure by hobbing.

17. A method as claimed in claim 15, wherein the steps of joining said first faces and affixing a plate to each of said second faces is accomplished by brazing.

18. A method of constructing a coupled cavity travelling wave tube having a slow wave structure, comprising the steps of:
   hobbing a billet to form a row of holes therein, said holes having axes that are parallel;
   slicing said billet at two spaced-apart and parallel planes which intersect said holes substantially perpendicular to the axes thereof to form a latticework structure having first and second parallel faces and having spaced-apart wall between said faces;
   machining a tunnel through said latticework structure along a line intersecting each of said walls to provide a beam hole;
   machining said first face at alternate walls to form coupling slots;
   machining said second face at alternate walls to form coupling slots; and
   joining a plate to each of said first and second faces.

19. A method as claimed in claim 18, wherein said holes are generally H-shaped in cross-section to provide buttresses at the centers of said walls, said buttresses extending from said first face to said second face, wherein said step of machining a tunnel is conducted to provide a tunnel through said buttresses, and further comprising the step of removing portions of said buttresses around said tunnel to leave tubes extending from said walls.

20. A method of constructing a coupled cavity travelling wave tube having a slow wave structure, comprising the steps of:
   hobbing a billet to form a serpentine hole therein, said hole having a pair of elongated sides that are spaced apart from one another, with wall portions extending from each side at least halfway to the other side;
   slicing said billet at two spaced-apart and parallel planes which intersect the sides of said hole to form a latticework structure having first and second parallel faces and staggered wall portions which extend between said faces;
   machining a tunnel through said latticework structure along a line intersecting each of said wall portions to provide a beam hole; and
   joining a plate to each of said first and second faces.

21. A method as claimed in claim 20, wherein said hole is configured to provide wall portions having buttress which extend from said first face to said second face, said buttress being disposed substantially midway between the sides of said hole and said tunnel extending through said buttresses, and further comprising removing portions of said buttresses around said tunnel to leave tubes extending from said wall portions.

* * * * *